United States Patent
Zendler (10) Patent No.: US 9,449,595 B2
(45) Date of Patent: Sep. 20, 2016

(54) SONOTRODE WITH PROCESSING CHANNEL

(75) Inventor: Stefan Zendler, Straubenhardt (DE)

(73) Assignee: Hermann Ultraschalltechnik GmbH & Co. KG, Karlsbad (DE)

( * ) Notice: Subject to any disclaimer, the term of this patent is extended or adjusted under 35 U.S.C. 154(b) by 299 days.

(21) Appl. No.: 14/005,303

(22) PCT Filed: Mar. 12, 2012

(86) PCT No.: PCT/EP2012/054283
§ 371 (c)(1),
(2), (4) Date: Nov. 5, 2013

(87) PCT Pub. No.: WO2012/123418
PCT Pub. Date: Sep. 20, 2012

(65) Prior Publication Data
US 2014/0092712 A1    Apr. 3, 2014

(30) Foreign Application Priority Data
Mar. 15, 2011 (DE) .......................... 10 2011 005 536

(51) Int. Cl.
*G10K 11/18* (2006.01)
*B06B 3/00* (2006.01)
(Continued)

(52) U.S. Cl.
CPC ............... *G10K 11/18* (2013.01); *B06B 3/00* (2013.01); *B29C 65/08* (2013.01); *B29C 66/8145* (2013.01); *B29C 66/9516* (2013.01)

(58) Field of Classification Search
CPC ..... B06B 3/00; B29C 65/08; B29C 66/8145; B29C 66/9516; G10K 11/18
See application file for complete search history.

(56) References Cited

U.S. PATENT DOCUMENTS

| | | | |
|---|---|---|---|
| 3,113,225 A | | 12/1963 | Kleesattel et al. |
| 4,131,505 A | * | 12/1978 | Davis, Jr. .................. B06B 3/00 156/580.1 |
| 4,363,992 A | * | 12/1982 | Holze, Jr. ................. B06B 3/00 310/323.19 |

(Continued)

FOREIGN PATENT DOCUMENTS

| | | |
|---|---|---|
| DE | 1 597 010 A1 | 4/1970 |
| DE | 603 18 573 T2 | 1/2009 |

(Continued)

OTHER PUBLICATIONS

Jerome Carre, German Patent Office, Office Action, German Application 12 712 234.9, Jun. 7, 2016 (see machine translation into English).

*Primary Examiner* — Luke Ratcliffe
*Assistant Examiner* — Hovhannes Baghdasaryan
(74) *Attorney, Agent, or Firm* — Paul & Paul (57) ABSTRACT

The present invention relates to an ultrasonic sonotrode with a main sonotrode body and a sealing area arranged on one side of the main sonotrode body. The main sonotrode body has two through-slits extending in or through the main sonotrode body respectively along a slit axis. These through-slits intersect in such a way that a through-channel through the main sonotrode body is formed from the one through-slit into the other through-slit. This creates a slit portion that is formed both by the one through-slit and the other through-slit. Provided in this main sonotrode body is a processing channel, which extends along a processing channel axis from a side area of the main sonotrode body up to the through-channel and is arranged substantially symmetrically about the processing channel axis.

12 Claims, 6 Drawing Sheets

(51) Int. Cl.
*B29C 65/08* (2006.01)
*B29C 65/00* (2006.01)

(56) References Cited

U.S. PATENT DOCUMENTS

| | | | | | |
|---|---|---|---|---|---|
| 5,095,188 | A | * | 3/1992 | Klein | B06B 3/00 |
| | | | | | 219/121.14 |
| 5,730,351 | A | * | 3/1998 | Hermann | B06B 3/00 |
| | | | | | 156/580.1 |
| 5,828,156 | A | * | 10/1998 | Roberts | B06B 3/00 |
| | | | | | 310/317 |
| 5,922,170 | A | * | 7/1999 | Gerdes | B29C 65/08 |
| | | | | | 156/580.1 |
| 7,004,182 | B2 | | 2/2006 | Duval | |
| 2012/0014221 | A1 | * | 1/2012 | Sherrit | B06B 3/00 |
| | | | | | 367/140 |

FOREIGN PATENT DOCUMENTS

| | | |
|---|---|---|
| EP | 0 468 125 A2 | 1/1992 |
| GB | 2 344 487 A | 6/2000 |
| WO | 99 17893 A1 | 4/1999 |
| WO | 03/033179 A1 | 4/2003 |

* cited by examiner

SONOTRODE WITH PROCESSING CHANNEL

The present invention concerns an ultrasonic sonotrode for ultrasonic processing comprising a sonotrode main body and a sealing surface which is arranged at one side of the sonotrode main body and which is intended to come into contact with a material to be processed.

Ultrasonic sonotrodes like that described here are used in manufacturing technology, for example in ultrasonic welding of plastic materials.

Ultrasonic welding is a method of joining plastic materials, using mechanical vibrations above the audible limit. The frequency range of ultrasonic vibrations is approximately between 20 kHz and one GHz. Mechanical vibrations in the ultrasonic frequency range are frequently produced from electric energy by means of piezoelectric sound transducers (converters). The resulting mechanical vibration energy is applied to the material to be processed by way of a sonotrode which is connected to the converter, possibly by way of an amplitude transformation member (booster). In that case the sonotrode is in direct contact with the material to be processed and passes the mechanical vibrations produced to the material under pressure. The purpose of the amplitude transformation member is to adapt the vibration amplitude afforded by the converter to the requirements of the material to be processed and to pass those vibrations to the sonotrode. The surface of the sonotrode, that is provided for coming into contact with the material to be processed, is also referred to as the sealing surface.

A sonotrode is thus a component part of a structure which vibrates in operation, comprising a converter, optionally an amplitude transformation member and the sonotrode. That vibrating structure is also referred to as an ultrasonic vibration unit.

To be able to ensure effective transmission of the ultrasonic vibrations to a material to be processed by means of an ultrasonic vibration unit it is necessary for the ultrasonic vibration unit be caused to resonate. The ultrasonic vibration unit, depending on its structure, generally has a plurality of different natural frequencies. Resonant vibration of the ultrasonic vibration unit can only be caused if the converter produces a natural frequency of the ultrasonic vibration unit. For that reason the converter and the ultrasonic vibration unit must be tuned to each other.

Because of the damping which occurs in any real system, a distinction is to be drawn precisely between resonant frequency and natural frequency. In accordance with the literature however, for the sake of simplicity, the terms resonant frequency and natural frequency are used synonymously in the present patent specification.

In ultrasonic welding the material to be processed is generally introduced between the sonotrode and a corresponding counterpart tool (anvil) which does not belong to the ultrasonic vibration unit. The ultrasonic energy is transmitted by way of the sealing surface from the sonotrode to the material to be processed. This involves conversion of ultrasonic vibrations into frictional energy whereby heat is produced, which leads to plasticization of the processed material. The cause of that thermal plasticization is interface and molecular friction phenomena.

Suitably large sealing surfaces are required for ultrasonic processing of large-area material portions. To cause those sealing surfaces to vibrate sonotrodes of correspondingly large dimensions are required. Optimum welding results can be achieved only with vibration amplitudes which are as uniform as possible, over the entire sealing surface. Material-governed material parameters like transverse contraction cause irregular deformation at the sealing surface, which have an adverse influence on the welding result in the case of excessively large sealing surfaces.

It is therefore advantageous for openings to be provided in the sonotrode main body. Those openings can provide for a more uniform vibration amplitude at the sealing surface. However the openings involve a generally undesirable notch effect which can reduce the service life of the sonotrode.

Frequently the sonotrode main body has one or more slits respectively extending along a slit axis through the sonotrode main body. As an alternative thereto it is also possible for only grooves to be provided in the sonotrode main body, instead of through slits. That however is generally less advantageous. Hereinafter therefore only the term "slit" is used, although in principle grooves would also be possible.

The term slit axis is used to denote that axis along which the slit extends into the sonotrode main body. In that respect the axis is disposed in the center of the slit.

Particularly if the sealing surface is very large in both dimensions, that is to say in length and width, it is already usual for the sonotrode to have slits in two mutually perpendicular directions, the slits intersecting within the sonotrode main body.

In other words the slits are such that a through passage is formed through the sonotrode main body from the one through slit into the other through slit. The through passage therefore has a first portion formed by the one through slit, a second portion formed by the other through slit, and an intersection portion which connects the first and second portions and is formed both by the one through slit and also by the other through slit.

Usually the slits are produced by milling so that, in the region of the intersection points, that is to say where the first portion, the second portion and the intersection portion meet, edges are formed.

The region of sharp edges, holes or changes in the cross-sectional area of objects however involves an even more greatly pronounced notch effect, that is to say local stress concentrations. Such local stress concentrations as a consequence of severe local tensile shearing or torsional loadings can result in local overloading of the material. That can lead to detrimental material damage. Consequently, as a result of those local stress concentrations, on the one hand the service life of the sonotrode is reduced, while on the other hand the maximum possible vibration amplitude which can be implemented with the sonotrode is also reduced.

To eliminate the sharp edges, the attempt has already been made to manually grind away the edge, by a suitable grinding tool being guided from the first portion over the intersection portion into the second portion. That post-machining operation however is very complicated and expensive.

It would therefore be highly desirable to provide a structure for an ultrasonic sonotrode, in which on the one hand the sonotrode mass can be appropriately reduced as a consequence of passages provided therein, while on the other hand a reduction in the service life or the maximum possible vibration amplitude of the sonotrode by virtue of the notch effect as a consequence of the mutually intersecting passages is very substantially prevented.

According to the invention that object is attained in that provided in the sonotrode main body is a machining passage extending along a machining passage axis from a side surface of the sonotrode main body to the through passage.

The machining axis is arranged substantially at the center of the through passage in a cross-section perpendicularly to the machining axis.

Such a machining passage permits easy direct access to the intersection portion of the openings in the sonotrode main body. The intersection regions can be appropriately processed by way of that machining passage and thus sharp edges which are possibly present or other detrimental geometrical aspects which contribute to an increased notch effect can be removed. That can be effected for example by means of brushing or polishing. Such a reduction in the notch effect permits either an increase in the service life of the sonotrode for a predetermined amplitude or an increase in amplitude with service life remaining the same.

It has surprisingly been found that the additional machining passages have practically no influence on the vibration characteristics of the sonotrode. Only a minimal displacement of the resonance frequency and a slight change in amplitude transformation is found to occur.

A preferred embodiment provides that the machining passage extends to the intersection portion of the through passage. That ensures that easy access to the entire intersection portion of the through passage is available through the machining passage. That makes it possible to remove sharp-edged shapes within the entire intersection portion of the through passage.

A further preferred embodiment provides that the slit axes of the two slits also intersect. The intersection of those axes ensures that the through passage which is formed is symmetrical and this therefore permits a vibration pattern which is as uniform as possible within the sonotrode.

For introducing the through slits it is advantageous if the two slit axes are oriented in mutually perpendicular relationship. That can ensure that all intersection angles within the sonotrode main body are 90°. That contributes to a reduction in the notch effect, which is correspondingly greater, the more acute that the angles are. Depending on the respective geometry of the sealing surface, such an arrangement of the slits can also be advantageous for affording a uniform vibration amplitude.

It is further advantageous if the machining passage axis if perpendicular to one or both slit axes.

If the machine passage axis and the two slit axes intersect at a point, this ensures access which is as central as possible and thus complete, to the entire intersection portion of the through passage. That facilitates symmetrical removal of sharp edges in the intersection portion whereby it is possible to avoid unnecessary one-sided material removal steps. In addition such a symmetrical arrangement enhances the overall symmetry of the openings within the sonotrode main body. A symmetrically uniform configuration, resulting therefrom, of the completely solid sonotrode sub-portions, ensures a vibration pattern of maximum regularity within the sonotrode.

For the purposes of reducing the machining complications and expenditure when producing the machining passages it has proven to be advantageous in practice if the one through slit is of a slit width $d_1$, the other through slit is of a slit width $d_2$ and the machining passage is of a width or a diameter $d_3$, wherein $(d_3)^2 > (d_1)^2 + (d_2)^2$. It is thus possible, for example in the course of a single bore oriented centrally relative to the center point of the intersection portion, to remove all sharp edges in the intersection portion. A machining passage of such a configuration, by virtue of its diameter $d_3$, permits on the one hand easy access to the intersection portion of the through passage, while on the other hand the extent of material removal is reduced to a minimum, which leads to a reduction in the effects of such removal on the vibration characteristics of the sonotrode.

For the purposes of the above-described removal of sharp edges in the region of the intersection portion it is helpful if the machining passage extends into the intersection portion and particularly preferably extends substantially to the opposite end of the intersection portion. Such an extent of the machining passage through the entire intersection portion of the through passage ensures both easy access to the complete intersection passage and also the possibility of completely removing detrimental sharp edges in the entire intersection portion, by virtue of introducing a single machining passage. In other words, the necessary machining of the sharp edges is already effected through boring of the machining passage as the bore is not only made so deep until the through passage is reached, but it extends into the intersection portion so that the sharp edges are removed by the boring operation. It is thus possible to machine the intersection portion and thereby reduce the notch effect with a single automated working step, namely the operation of boring out the machining passage.

A further advantageous embodiment is characterised in that a plurality of machining passages extend along respective machining passage axes to the through passage. In such a situation involving a plurality of machining passages it is possible for a respective specific machining passage to be used for the different regions of the intersection portion, that are problematical in regard to the notch effect. That permits optimum adaptation of the individual machining passages to the respective regions of the intersection portion. At the same time, by virtue of the increased number of machining passages, it is possible to avoid excessive removal of sonotrode material so that displacement of the natural frequency of the sonotrode is still further reduced.

In a further preferred embodiment it is provided that the two slits are of identical cross-sections perpendicularly to the respective slit axis.

Further advantages, features and possible uses of the present invention will be clearly apparent from the description hereinafter of some preferred embodiments and the accompanying Figures in which.

It will be appreciated that both the foregoing general description and also the precise description hereinafter are only illustrative by way of example and are intended to provide a further explanation of the claimed invention.

Figure 1:
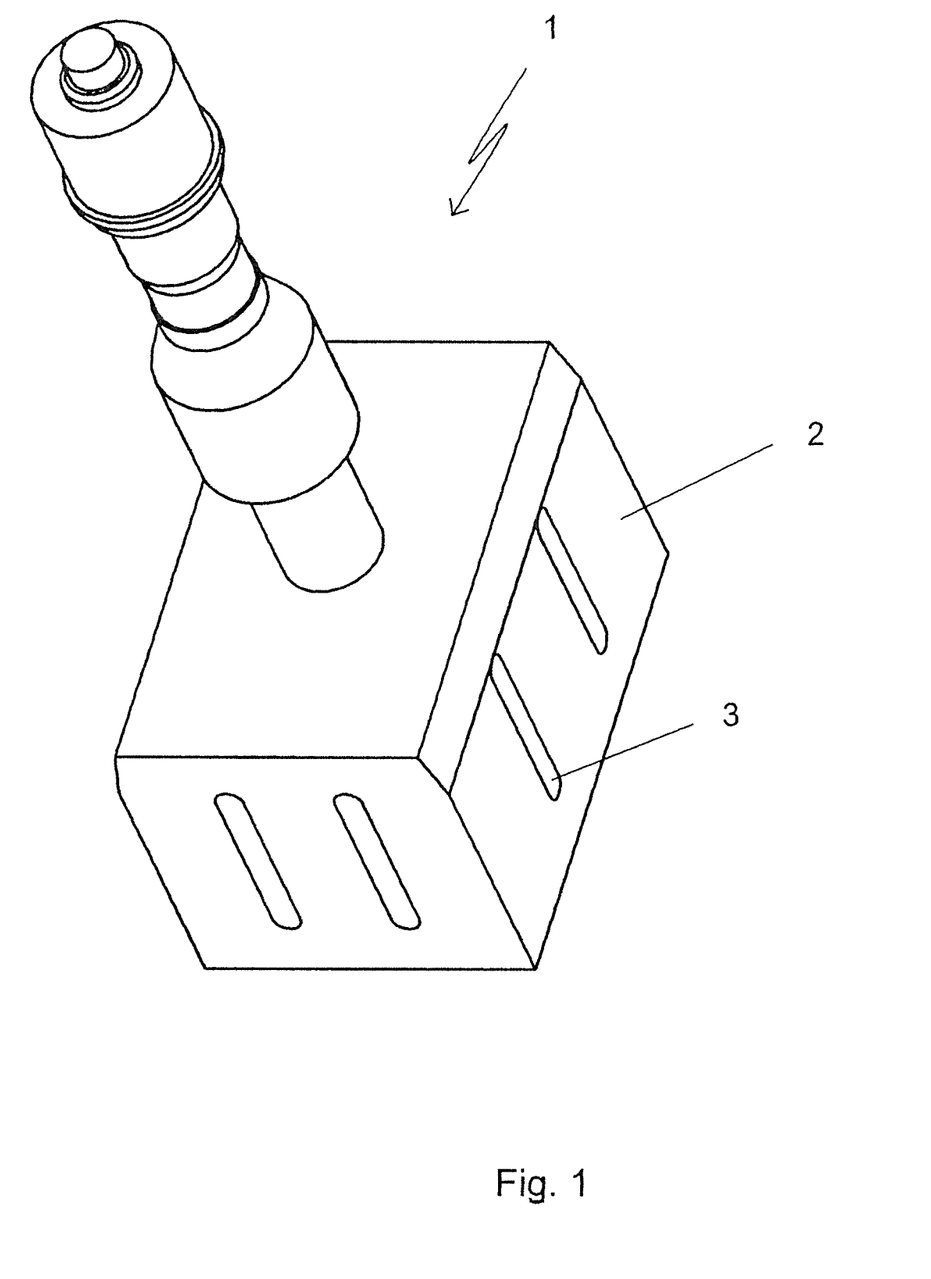
FIG. 1 shows an embodiment of a sonotrode in the state of the art without machining passage.

FIG. 1 shows an ultrasonic sonotrode 1 which includes a sonotrode main body 2 of a substantially cuboidal configuration. The sonotrode main body 2 has four through slits 3. In that case each through slit 3 intersects the two through slits 3 extending perpendicularly thereto.

Figure 2:
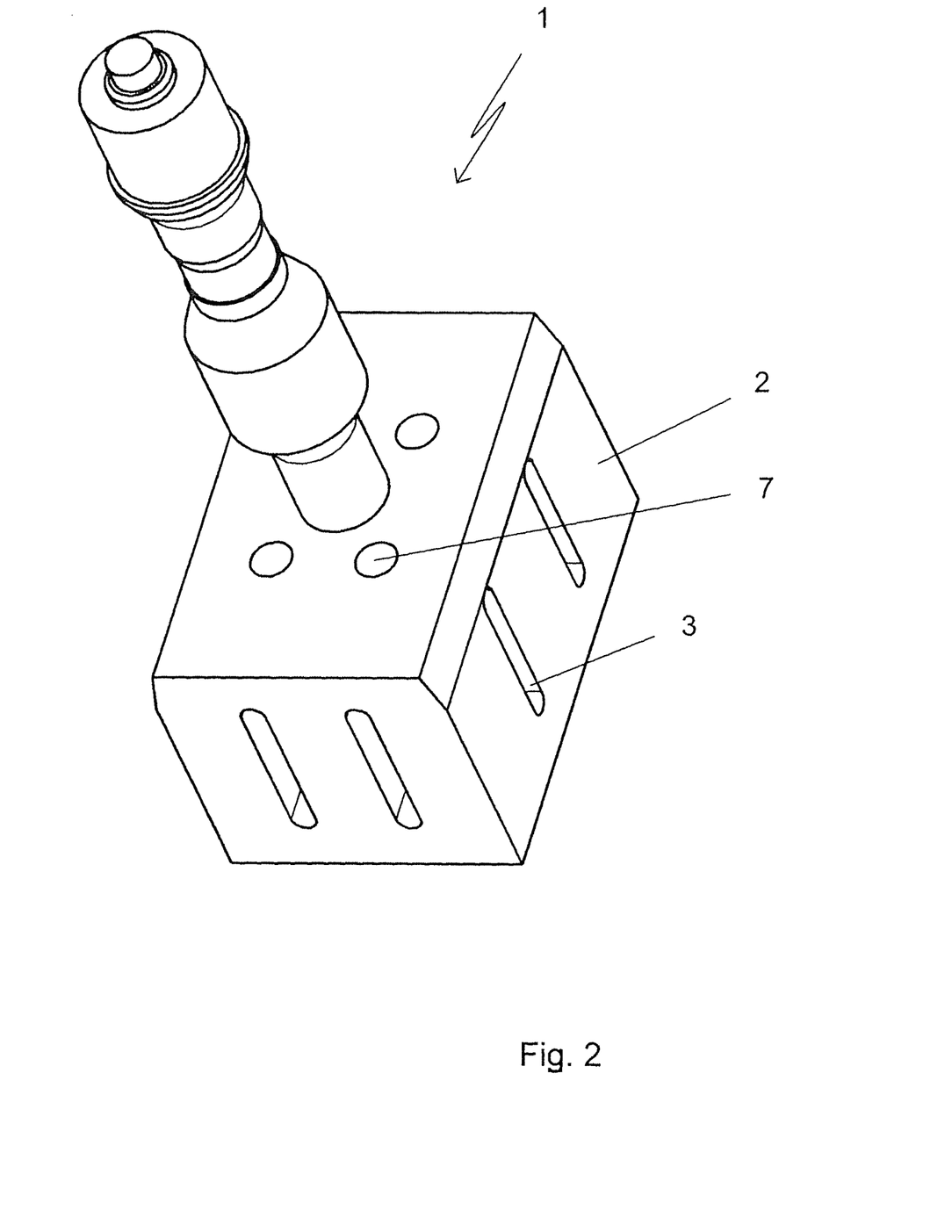
FIG. 2 shows an embodiment according to the invention of a sonotrode with machining passage.

FIG. 2 shows a first embodiment of the invention. The sonotrode 1 is very similar to the sonotrode shown in FIG. 1. It will be noted however that here there are additionally machining passages 7 extending from the side of the sonotrode main body, that is opposite to the sealing surface, perpendicularly in the direction of the sealing surface. Basically it would be possible for the machining passages to extend through the sealing surface. That however is not the case in the preferred embodiment shown.

Figures 3A, 3B:
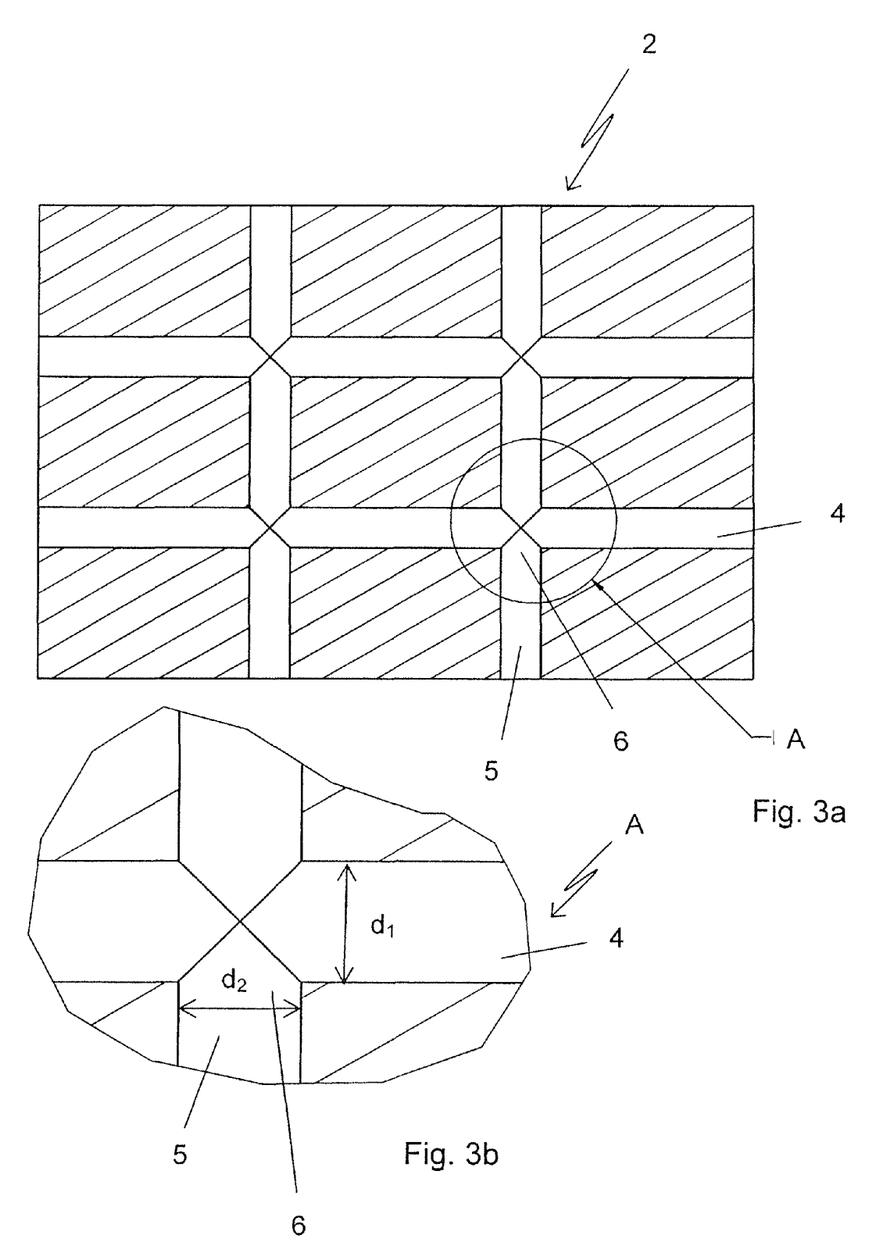
FIG. 3*a* shows a cross-section through the sonotrode main body of FIG. 1 parallel to the sealing surface.
FIG. 3*b* shows a detail view of an intersection portion from FIG. 3*a*.

FIG. 3a shows a cross-section of the sonotrode main body 2 parallel to the sealing surface of the sonotrode. The slits 3 extending perpendicularly to each other intersect so that a through passage is formed, which is formed by a first portion 4 of the first slit, a second portion 5 of the second slit and an intersection portion 6 formed by the first slit and also the second slit.

Overall four intersection portions are formed by the four slits.

FIG. 3b shows a detail view of the intersection portion 6 from FIG. 3a. This detail view A shows four edges in the intersection portion 6 of the two through slits of the widths $d_1$ and $d_2$.

Figures 4A, 4B:
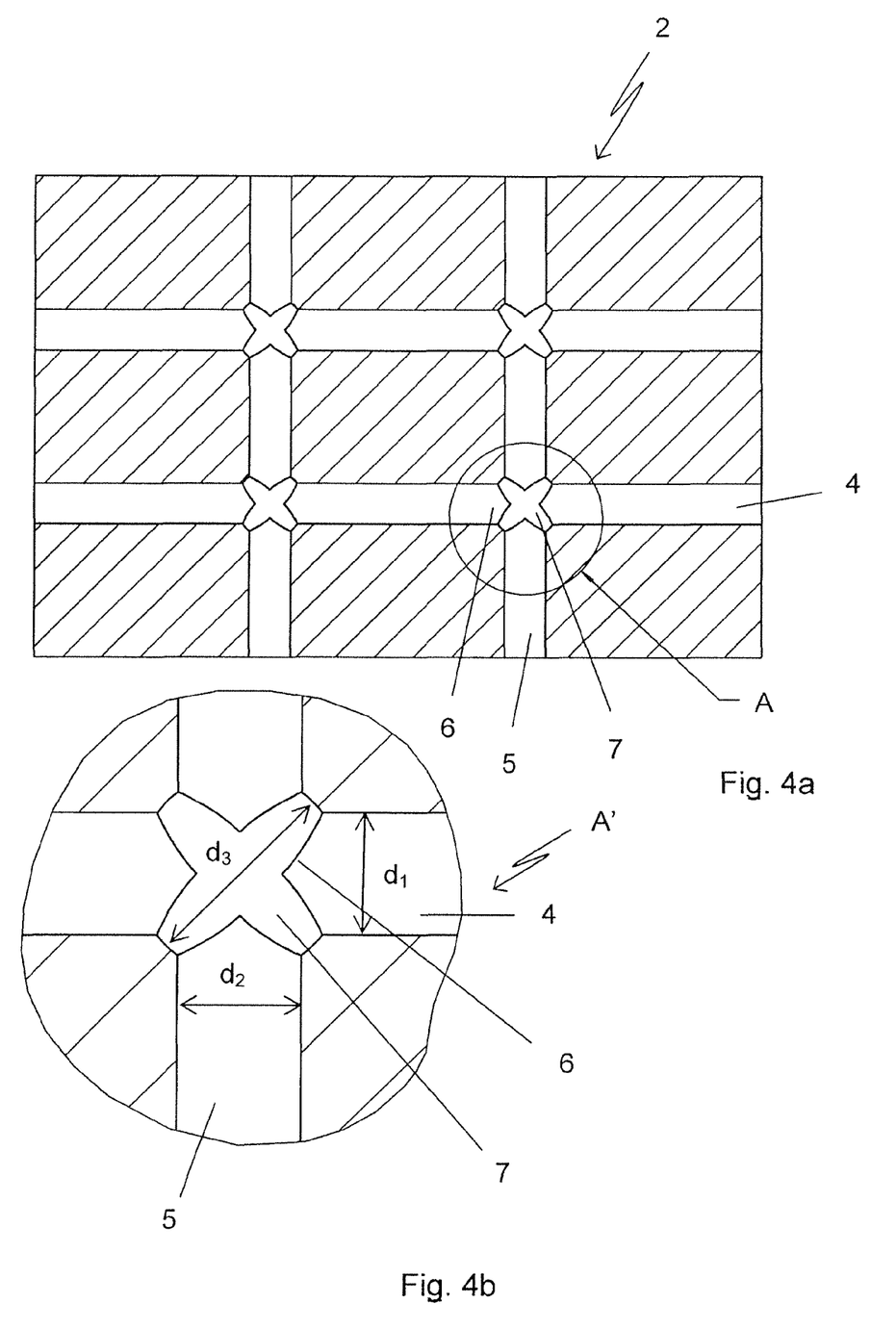
FIG. 4*a* shows a cross-section through the sonotrode main body of the FIG. 2 sonotrode.
FIG. 4*b* shows a detail view of an intersection portion from FIG. 2*a*.

FIG. 4a shows a corresponding cross-section through the sonotrode illustrated in FIG. 2. In this case also the Figure shows four through slits 3 which intersect at a right angle. Due to the additional machining passages 7 however the intersection region 6 is of a different configuration, as can be seen in particular from the enlarged view in FIG. 4b. The 90° edges which are formed at the edge between first and second slits are removed through the machining passages 7 of the diameter $d_3$ so that the notch effect is reduced.

Figures 5A, 5B:
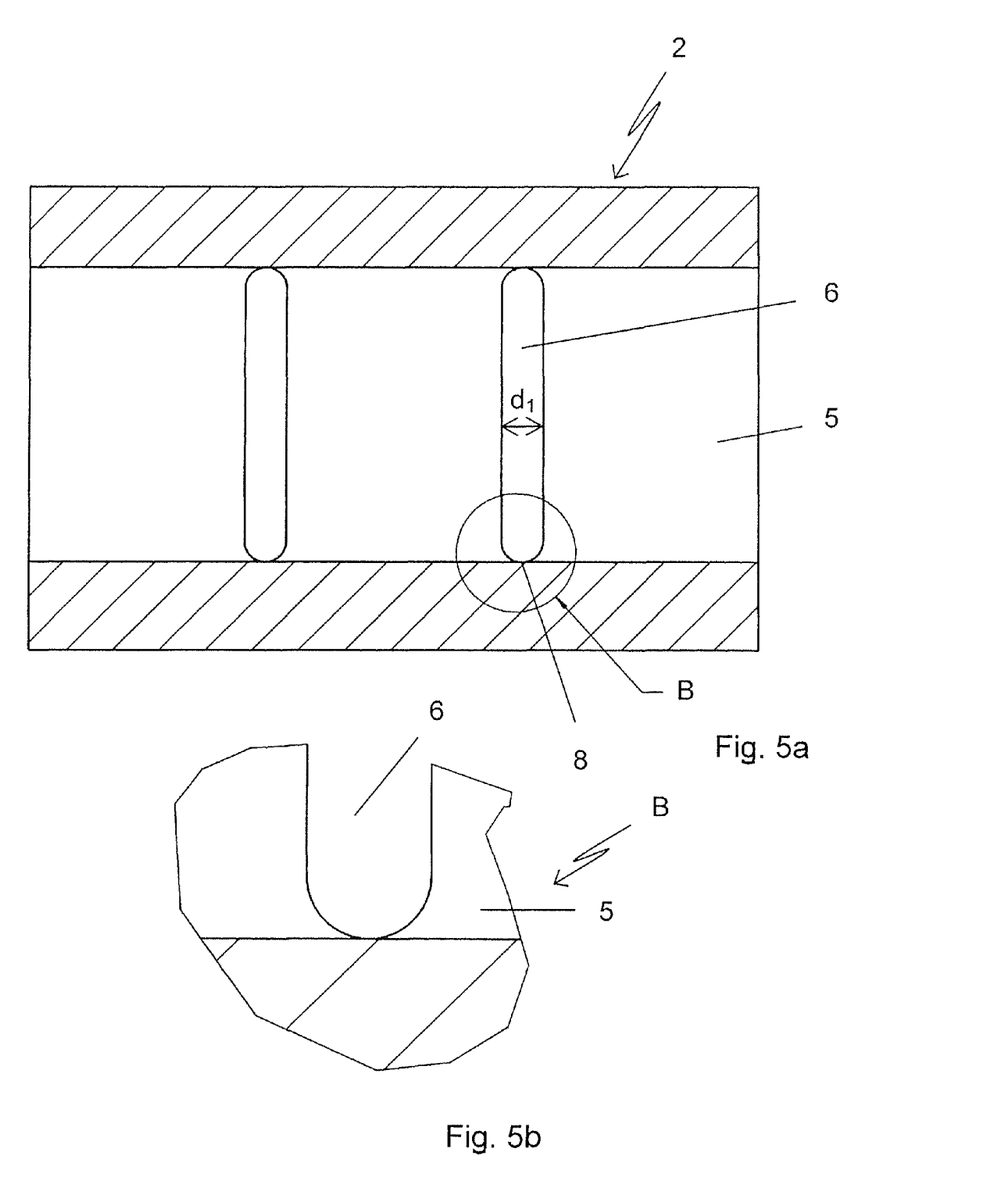
FIG. 5*a* shows a cross-section through the second passage perpendicularly to the first passage of the sonotrode main body from FIG. 1.
FIG. 5*b* shows a detail view of the end of an intersection portion from FIG. 5*a*.

FIG. 5a shows a further cross-section through the sonotrode main body of the sonotrode 1 shown in FIG. 1. The cross-section shown here extends through the intersection portion perpendicularly to the slit of the width $d_1$. The rounded end of the one intersection portion 8 is shown in detail in FIG. 5b.

Figures 6A, 6B:
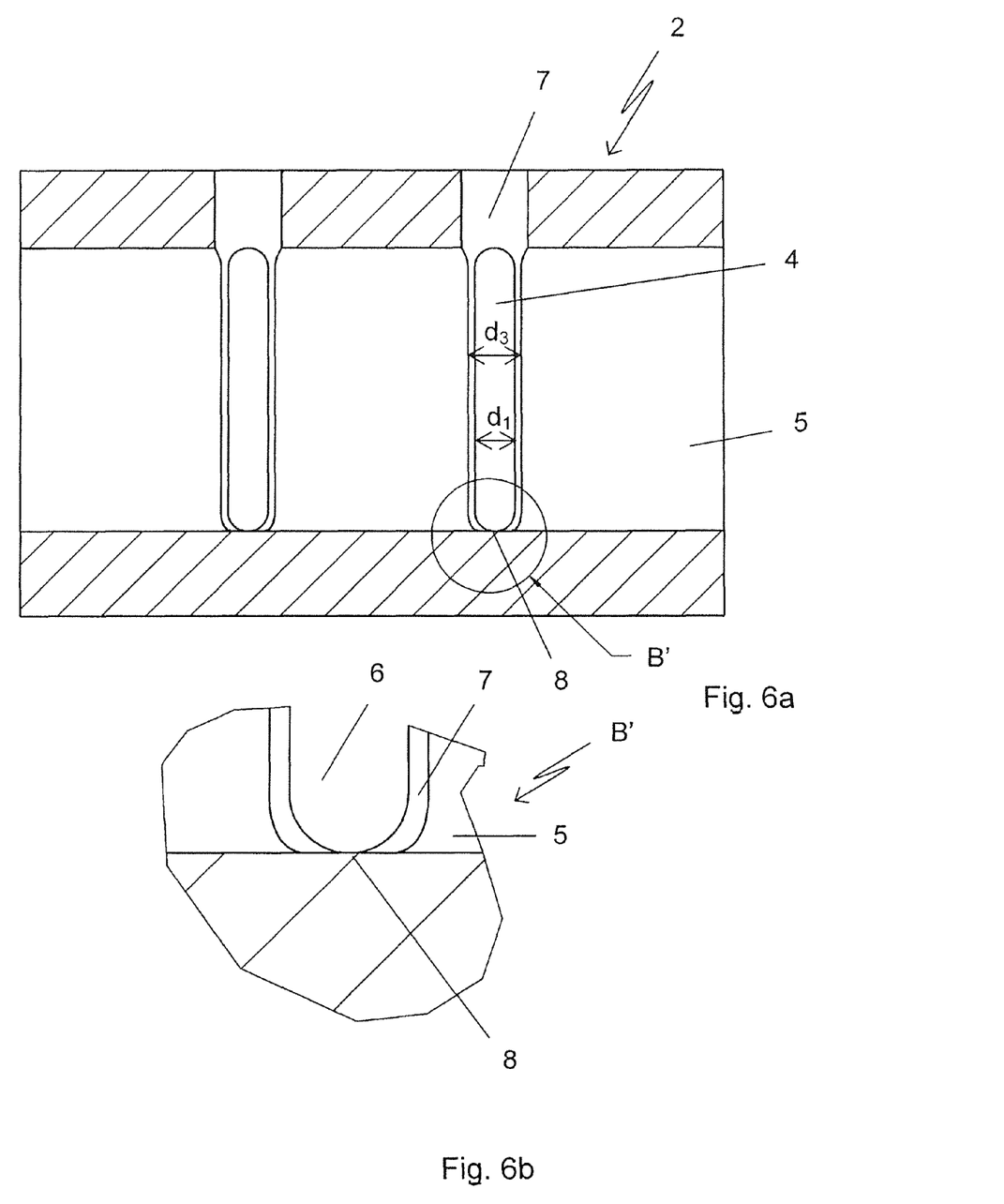
FIG. 6*a* shows a cross-section through the second passage perpendicularly to the first passage of the sonotrode main body from FIG. 2.
FIG. 6*b* shows a detail view of the end of an intersection portion from FIG. 6*a*.

FIG. 6a shows a corresponding cross-section through the sonotrode main body of FIG. 2. It can be clearly seen that the intersection portion is increased in size by the machining passages 7 of the diameter $d_3$ so that the sharp edges are removed and the notch effect is reduced.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features and groups of features disclosed here insofar as that has not been expressly excluded or technical aspects make such a combination impossible or meaningless. A comprehensive explicit representation of all conceivable combinations of features is dispensed with here only for the sake of brevity and readability of the description.

While the description has been illustrated and described in detail in the drawings and preceding description that illustration and description is only by way of example and is not deemed to be a limitation on the scope of protection as defined by the claims. The invention is not limited to the disclosed embodiments.

Modifications in the disclosed embodiments are apparent to the man skilled in the art from the drawings, the description and the accompanying claims. In the claims the word "have" does not exclude other elements or steps and the indefinite article "a" does not exclude a plurality. The mere fact that certain features are claimed in different claims does not exclude the combination thereof. References in the claims are not deemed to be a limitation on the scope of protection.

LIST OF REFERENCES 1 sonotrode
2 sonotrode main body
3 through slits
4 first portion
5 second portion
6 intersection portion
7 machining passage
8 end of the intersection portion
$d_1$ slit width
$d_2$ slit width
$d_3$ width of the machining passage
A detail view of the intersection portion
A' detail view of the intersection portion
B detail view of the end of the intersection portion
B' detail view of the end of the intersection portion

The invention claimed is:

1. A sonotrode (1) for ultrasonic processing comprising a sonotrode main body (2) and a sealing surface which is arranged at one side of the sonotrode main body (2) and which is intended to come into contact with a material to be processed, wherein the sonotrode main body (2) has two through slits (3) which respectively extend along a slit axis in or through the sonotrode main body (2) and which are arranged substantially symmetrically around the slit axes, wherein the through slits (3) intersect in such a way that a through passage is formed through the sonotrode main body (2) from the one through slit (3) into the other through slit (3) so that the through passage has a first portion (4) formed by the one through slit (3), a second portion (5) formed by the other through slit (3) and an intersection portion (6) connecting the first and the second portions (4, 5) and formed both by the one through slit (3) and also by the other through slit (3), characterised in that there is provided a machining passage (7) extending along a machining passage axis from a side surface of the sonotrode main body (2) to the through passage, wherein the one through slit (3) is of a slit width $d_1$, the other through slit (3) is of slit width $d_2$, and the machining passage (7) is of a width or diameter $d_3$, wherein $(d_3)^2 > (d_1)^2 + (d_3)^2$, and further wherein the sonotrode main body has side opposite to the sealing surface, and the machining passage extends from the side of the sonotrode main body opposite to the sealing surface, perpendicularly in the direction of the sealing surface.

2. A sonotrode (1) as set forth in claim 1 characterised in that the machining passage (7) extends to the intersection portion (6) of the through passage.

3. A sonotrode (1) as set forth in one of claims 1 and 2 characterised in that the two slit axes are oriented in mutually perpendicular relationship.

4. A sonotrode (1) as set forth in one of claims 1 through 2 characterised in that the machining passage axis is perpendicular to one or both slit axes.

5. A sonotrode (1) as set forth in one of claims 1 through 2 characterised in that the machining passage (7) extends into the intersection portion (6).

6. A sonotrode (1) as set forth in one of claims 1 through 2 characterised in that a plurality of machining passages (7) extend along respective machining passage axes to the through passage.

7. A sonotrode (1) as set forth in one of claims 1 through 2 characterised in that the two through slits (3) are of identical cross-sections perpendicularly to their slit axis.

8. A sonotrode (1) as set forth in one of claims 1 through 2 characterised in that the machining passage (7) is of a circular cross-section perpendicularly to the machining passage axis.

9. A sonotrode (1) as set forth in claim 4 characterised in that the machining passage axis and the two slit axes intersect at a point.

10. A sonotrode (1) as set forth in claim 5 characterised in that the machining passage (7) extends substantially to the opposite end (8) of the intersection portion (6).

11. A sonotrode (1) for ultrasonic processing comprising a sonotrode main body (2) and a sealing surface which is arranged at one side of the sonotrode main body (2) and which is intended to come into contact with a material to be processed, wherein the sonotrode main body (2) has two through slits (3) which respectively extend along a slit axis in or through the sonotrode main body (2) and which are arranged substantially symmetrically around the slit axes, wherein the through slits (3) intersect in such a way that a through passage is formed through the sonotrode main body (2) from the one through slit (3) into the other through slit (3) so that the through passage has a first portion (4) formed by the one through slit (3), a second portion (5) formed by the other through slit (3) and an intersection portion (6) connecting the first and the second portions (4, 5) and formed both by the one through slit (3) and also by the other through slit (3), characterized in that there is provided a machining passage (7) extending along a machining passage axis from a side surface of the sonotrode main body (2) to the through passage, wherein the one through slit (3) is of a slit width $d_1$, the other through slit (3) is of slit width $d_2$, and the machining passage (7) is of a width or diameter $d_3$, wherein $(d_3)^2 > (d_1)^2 + (d_3)^2$ and characterised in that a plurality of machining passages (7) extend along respective machining passage axes to the through passage and that each of the machining passage axes of the plurality of machining passages (7) is arranged substantially symmetrically around the corresponding intersection point of the two slit axes.

12. A sonotrode (1) as set forth in claim 11 characterised in that the machining passage (7) extends to the intersection portion (6) of the through passage.

\* \* \* \* \*

UNITED STATES PATENT AND TRADEMARK OFFICE
CERTIFICATE OF CORRECTION

| | | |
|---|---|---|
| PATENT NO. | : 9,449,595 B2 | |
| APPLICATION NO. | : 14/005303 | |
| DATED | : September 20, 2016 | |
| INVENTOR(S) | : Stefan Zendler | |

It is certified that error appears in the above-identified patent and that said Letters Patent is hereby corrected as shown below:

Title Page

Change Assignee to read as follows: -- Herrmann Ultraschalltechnik GmbH & Co. KG --

Specification

Column 3, Line 41, change "axis if" to -- axis is --

Signed and Sealed this
Thirteenth Day of December, 2016

Michelle K. Lee
*Director of the United States Patent and Trademark Office*